United States Patent [19]
Apel

[11] 3,900,254
[45] Aug. 19, 1975

[54] STILL PICTURE PROJECTOR
[75] Inventor: Wolfgang Apel, Dresden, Germany
[73] Assignee: VEB Pentacon, Dresden, Germany
[22] Filed: Mar. 25, 1974
[21] Appl. No.: 454,442

[52] U.S. Cl. .................... 353/68; 353/21; 353/68; 353/122
[51] Int. Cl. ........................................ G03b 21/00
[58] Field of Search ......... 353/68, 120, 114, 79, 71, 353/21, 119, 122

[56] References Cited
UNITED STATES PATENTS
3,556,650   1/1971   Pennock, Jr. .................... 353/21

Primary Examiner—Richard E. Aegerter
Assistant Examiner—Larry Jones
Attorney, Agent, or Firm—William Anthony Drucker

[57] ABSTRACT

A still picture projector has a housing, an aperture within the housing, a light path passing through the aperture, means for introducing into and returning slides from the aperture and means for introducing an additional image carrier into the aperture, the slide return element being movably mounted so as to move away from the aperture upon the insertion of an additional slide carrier therein.

7 Claims, 3 Drawing Figures

STILL PICTURE PROJECTOR

BACKGROUND OF THE INVENTION

The invention relates to a device for inserting additional image carriers, particularly film guides, into the aperture (or film trap) of still picture projectors, preferably projectors with automatic slide changers.

Automatic still picture projectors are known which comprise several apertures for several image carriers, for example one for the projection of slides, followed by another one for film tapes. This provides satisfactory operating conditions but the projector is much too elaborate with regard to component parts and space requirements.

In other known automatic projectors the slide return element which remains in the aperture can be folded back by hand with the aid of a locking device and a joint, out of the area of the additional image carrier to be inserted. This results in low expenditure of space and parts but also in disadvantageous operating conditions. Moreover, the operating reliability is endangered because it is easy to forget to fold the slide return element back when the additional image carrier is removed. This leads to disturbances in the transport of the slides.

The object of the invention is to provide a device which ensures, at little expense, a high operating reliability especially of automatic projectors during the changing of the image carrier.

SUMMARY OF THE INVENTION

According to the invention there is provided in a still picture projector having a housing, a light path within said housing means defining an aperture within said housing in the light path, a first opening in the housing whereby an image carrier is movable into the aperture and a second opening in the housing whereby an image carrier is movable into the aperture, the provision of:

a. means for moving an image carrier in the form of slide into said aperture via said first opening, and b. a slide return element movably mounted within the housing for moving said slide out of said aperture, and means responsive thereto the introduction of an image carrier into said aperture via said second opening to move the slide return element away from the aperture.

Advantageously, the slide return element is spring mounted on a base attached to a guide rod, the base projecting into the plane of the aperture but having a recess so positioned that said base does not protrude into the aperture. In an advantageous embodiment of the invention the slide return element has a nose which protrudes into the recess of the base and is provided a sloping edge. The sloping edge is provided for abutment by the additional image carrier when the latter is inserted in the aperture.

A variant of the design of the slide return element according to the invention provides for the slide return element to be designed as a lever which is pivotally mounted on the base and whose pivotal motion is limited in the direction of the plane of the aperture by a stop while its other side is in contact with a spring.

A second variant of the invention provides for the slide return element to be designed as a sliding body which is arranged in an opening of the base and whose sliding movement is limited in the direction of the plane of the aperture by a stop on the body and in the other direction by a spring in contact with the body and the base. The opening and the part of the slide return element sliding therein expediently have a profile which does not allow the slide return element to turn in the opening.

The advantages resulting from the invention consist in that the insertion of an additional image carrier into the aperture via the second opening takes place more economically with the use of simple means, that the operating reliability is always ensured and operation is more convenient.

BRIEF DESCRIPTION OF THE DRAWINGS

The invention will now be illustrated and described in greater detail with reference to an embodiment.

In the drawing.

SPECIFIC DESCRIPTION OF PREFERRED EMBODIMENTS

Figure 1:
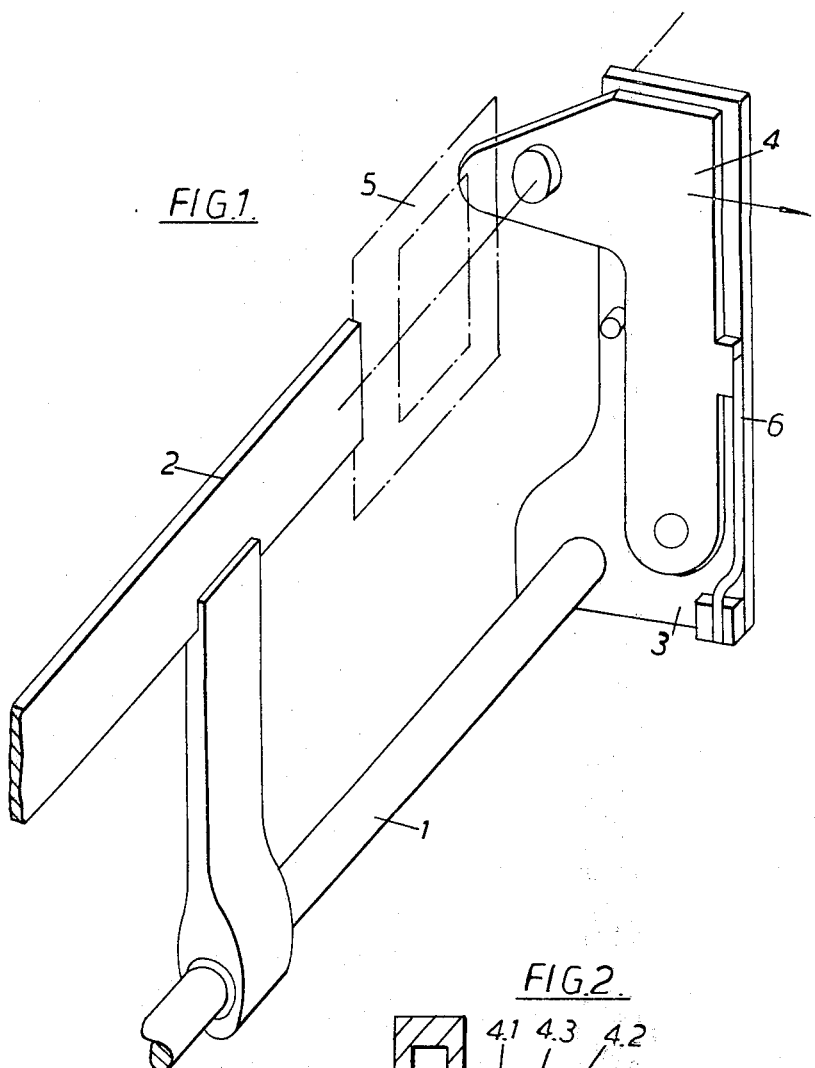
FIG. 1 shows a perspective illustration of the slide transport mechanism in the aperture.

As not shown in detail in the drawing, a still picture projector has a housing within which is arranged slide support means defining an aperture through which the light path of the projector passes. The slides are situated in the compartments of a magazine which is either guided through a tunnel of the projector housing or on a guide track situated outside the projector housing and resting against this latter. From this point the slides are moved into the path of the projection rays by the slide pushing device 2 and moved back by the slide return element 4, in the zone of the slide carrier. To enable an additional image carrier, such as a guide shaft for film strips, to be inserted, an opening is provided in the projector housing above the slide carrier, the opening preferably capable of being closed, and the said additional unit being inserted into the aperture via the opening.

In the case of an image strip guide, it is thus only the guide shaft that is inserted into the housing, while the attachable film cassettes and the film strip transport device, which can be operated manually or automatically, as required, are situated outside the housing.

Figure 2:
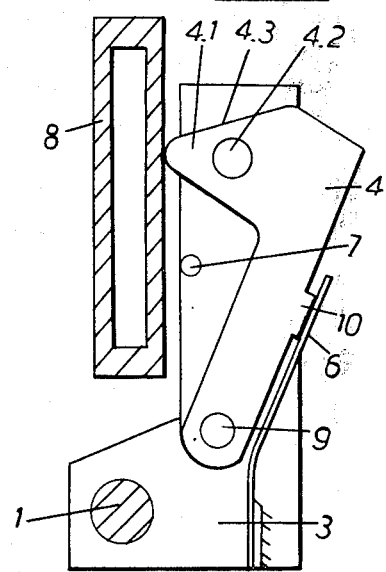
FIG. 2 is the illustration of a version of the slide return element according to the invention.

As will be seen in particular from FIG. 1, the transport mechanism in the aperture for slides 5 essentially consists of a guide rod 1 whereon are arranged a slide pusher 2 and a slide return element 4. The slide return element 4 is movably arranged on a base 3 which has a recess in the slide plane and is in contact with a spring 6 on the base 3, which is advantageously prestressed. Furthermore, the slide return element 4 has a nose 4.1 which protrudes into the recess of the base 3. The nose 4.1 is provided with a slope 4.3 and with a stop 4.2 for supporting slides 5 during projection. A variant of this version of the slide return element 4 is shown in FIG. 2. Here the slide return element 4 is designed as a lever which swivels around a point of rotation 9 and the motion of which is limited on the side of the recess by a stop 7 on the base 3 while it is provided on the other side with a projection 10 supporting the spring 6 against which the slide return element 4 is moved when an additional image carrier 8 is inserted.

Figure 3:
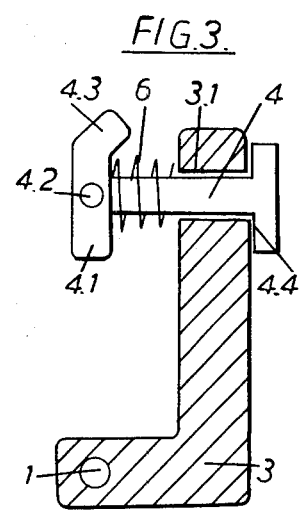
FIG. 3 shows another version of the slide return element.

In another variant according to FIG. 3 the slide return element 4 is a sliding body which is arranged in an opening 3.1 of the base 3 and the displacement of which is limited by a stop edge 4.4. Here too, the base 3 is in contact via a spring 6 with the slide return element 4, especially with its nose 4.1.

If, for example, film tapes are to be projected, instead of slide 5, the slide pusher 2 is withdrawn and the additional image carrier 8 in the form of the film guide is inserted into the aperture where it serves itself as actuating member for the slide return element 4 which has remained in the aperture and which it presses sideways against the action of the spring by impinging on the slope 4.3 of the nose 4.1. The slide return element 4 is thus under the influence of the tension of the spring 6 and is therefore immediately returned to its starting position when the additional image carrier 8 is removed. The conditions for alternating operation are thus provided without additional manipulation and disturbances in the operation of the projector cannot occur because the folding back of the slide return device has been forgotten.

The invention is not limited to the examples here illustrated. It is also possible to use it in projectors which are operated by hand. Likewise, the use of additional image carriers relates not only to film guides: microfilm carriers and the like are also conceivable.

I claim:

1. In a still picture projector having a housing, a light path within said housing, means defining an aperture within said housing in the light path, a first opening in the housing whereby an image carrier is movable into the aperture and a second opening in the housing whereby an image carrier is movable into the aperture, the provision of:
   a. means for moving an image carrier in the form of slide into said aperture via said first opening, and
   b. a slide return element movably mounted within the housing for moving said slide out of said aperture, and means responsive to the introduction of an image carrier into said aperture via said second opening, to move the slide return element away from the aperture.

2. The device according to claim 1, wherein there is provided within the housing a movable guide rod having attached thereto a base on which the slide return element is mounted.

3. The device according to claim 2, wherein said base protrudes into the plane of the aperture and is provided with a recess so positioned that said base does not protrude into the aperture.

4. The device according to claim 3, wherein the slide return element has a nose which protrudes into the recess of the base and is provided with a sloping edge for abutment with an image carrier introduced into said aperture via said second opening.

5. The device according to claim 4, wherein said slide return element is pivotally mounted on the base, the base being provided with a stop and a spring, the stop being positioned to limit the pivotal movement of the slide return element in one pivotal direction and the spring being positioned to engage the slide return element to limit the pivotal movement of the slide return element in the other pivotal direction.

6. The device according to claim 4, wherein the slide return element is slidably arranged in an opening of the base, sliding movement of the slide return element being limited in one direction by a stop and in another direction by a spring.

7. The device according to claim 1 wherein the means for moving an image carrier in the form of a slide into a supporting means is on a guide rod.

* * * * *